United States Patent
Yuan

(10) Patent No.: US 7,764,358 B2
(45) Date of Patent: Jul. 27, 2010

(54) DISTANCE MEASURING SYSTEM

(75) Inventor: Kun-I Yuan, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 62 days.

(21) Appl. No.: 12/330,564

(22) Filed: Dec. 9, 2008

(65) Prior Publication Data
US 2009/0262329 A1    Oct. 22, 2009

(30) Foreign Application Priority Data
Apr. 18, 2008   (CN) ................... 2008 1 0301192

(51) Int. Cl.
*G01C 3/08* (2006.01)
(52) U.S. Cl. .................. 356/4.01; 356/3.01; 356/4.03
(58) Field of Classification Search ............... 356/3.01, 356/3.14, 4.01–4.06
See application file for complete search history.

(56) References Cited

U.S. PATENT DOCUMENTS

| | | | | |
|---|---|---|---|---|
| 5,321,488 A | * | 6/1994 | Irie | 356/3.14 |
| 5,642,299 A | * | 6/1997 | Hardin et al. | 702/142 |
| 5,760,896 A | * | 6/1998 | Suzuki | 356/3.08 |
| 6,337,736 B1 | * | 1/2002 | Sugiyama et al. | 356/3.14 |
| 7,042,560 B2 | * | 5/2006 | Kanemitsu et al. | 356/139.1 |
| 7,046,344 B2 | * | 5/2006 | Yamamoto et al. | 356/4.01 |
| 7,054,550 B2 | * | 5/2006 | Mihara et al. | 396/104 |
| 7,583,363 B2 | * | 9/2009 | Yuan | 356/3.01 |

* cited by examiner

*Primary Examiner*—Isam Alsomiri
(74) *Attorney, Agent, or Firm*—Clifford O. Chi

(57) ABSTRACT

A distance measuring system includes a light source, an image capture apparatus, a light absorption member and a signal processing circuit. The image capture apparatus includes a first lens module, a second lens module and an image sensor. The lens modules respectively have a focus. The image sensor detects light from the light source at two optical spots of the two lens modules, respectively. The light absorption member is disposed generally between the two lens modules for absorbing light reflected from the lens modules and thereby reducing optical interference. The signal processing circuit is configured for calculating the ratios of the two distances to the focal lengths of the respective focuses. A perpendicular distance between the light source and a line passing through the centers of the first and second lens modules is obtained.

6 Claims, 1 Drawing Sheet

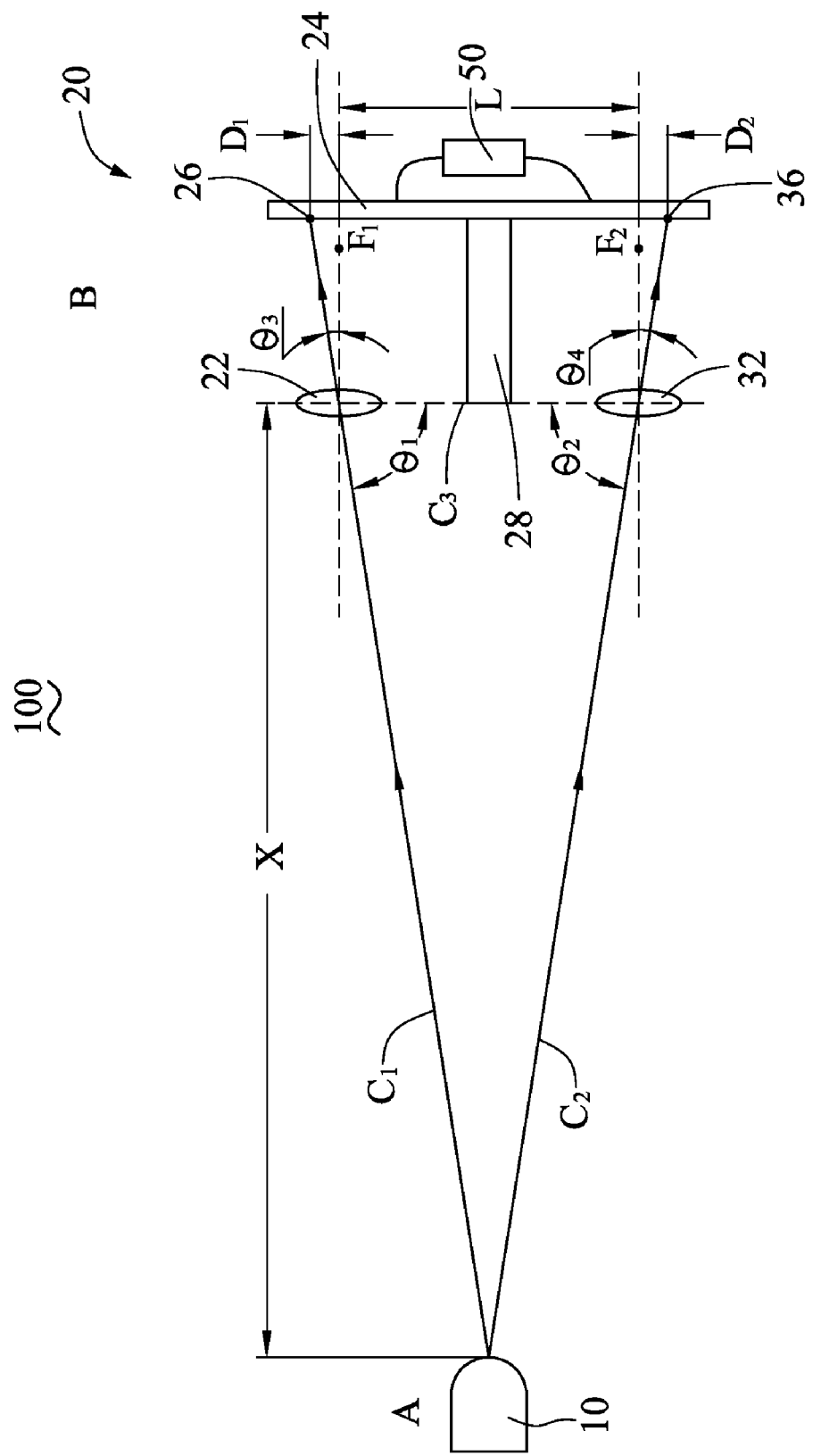

DISTANCE MEASURING SYSTEM

RELATED APPLICATION

This application is related to commonly-assigned, co-pending U.S. patent application Ser. No. 11/945,528, entitled "RANGE FINDER SYSTEM AND ELECTRONIC SYSTEM HAVING SAME." The disclosure of the above-identified application is incorporated herein by reference.

BACKGROUND

1. Technical Field

The disclosure generally relates to distance measure, particularly, to a distance measuring system using light to measure the distance between two target objects.

2. Description of Related Art

A laser rangefinder is a device which uses a laser beam in order to determine the distance to a reflective object. The most common form of laser rangefinder operates on a principle similar to the time-of-flight principle; that is, by sending a laser pulse in a narrow beam towards the object, and measuring the time taken by the pulse to be reflected off the object and returned to the point of origin. Due to the high speed of light, this technique is not appropriate for high precision sub-millimeter measurements. In addition, the laser rangefinder is typically very expensive.

What is needed, therefore, is a distance measuring system which can overcome the above problems.

SUMMARY

A distance measuring system includes a light source, an image capture apparatus, a light absorption member and a signal processing circuit. The image capture apparatus includes a first lens module, a second lens module and an image sensor. The lens modules respectively have a focus. The image sensor detects light from the light source at two optical spots of the two lens modules, respectively. The light absorption member is disposed generally between the two lens modules for absorbing light reflected from the lens modules and thereby reducing optical interference. The signal processing circuit is configured for calculating the ratios of the two distances to the focal lengths of the respective focuses. A perpendicular distance between the light source and a line passing through the centers of the first and second lens modules is obtained.

BRIEF DESCRIPTION OF THE DRAWING

The figure is a schematic diagram of a distance measuring system in accordance with an exemplary embodiment of the present invention, showing essential light paths thereof.

Corresponding reference characters indicate corresponding parts or features. The exemplifications set out herein illustrate at least one preferred embodiment of the present distance measuring system, in one form, and such exemplifications are not to be construed as limiting the scope of the disclosure in any manner.

DETAILED DESCRIPTION OF EMBODIMENTS

Referring to the figure, a distance measuring system 100 in accordance with an exemplary embodiment of the present disclosure includes a light source 10, an image capture apparatus 20, and a signal processing circuit 50.

The light source 10 can for example be a laser light source, a halogen light source, a fluorescent light source, or a light-emitting diode.

The image capture apparatus 20 includes a first lens module 22, a second lens module 32, and an image sensor 24. A distance L is defined between a center axis of the first lens module 22 and a center axis of the second lens module 32. The first lens module 22 has a first focus F1. The second lens module 32 has a second focus F2. The first lens module 22 and the second lens module 32 are disposed between the light source 10 and the image sensor 24. The image sensor 24 can be a charge-coupled device or a complementary metal oxide semiconductor.

The signal processing circuit 50 is connected to the image sensor 24 of the image capture apparatus 20.

The light source 10 is disposed at a first position A. The image capture apparatus 20 is located at a second position B. The image capture apparatus 20 detects two light beams C1, C2 emitted from the light source 10, and measures geometrical characteristics associated with the light beams C1, C2. In particular, the light beams C1, C2 transmit through the first lens module 22 and the second lens module 32, respectively, and thence to the image sensor 24. The image sensor 24 detects the light beams C1, C2 at respective optical spots 26, 36 of the first and second lens modules 22, 32. The two optical spots 26, 36 are located distances D1, D2 from nearest points of the center axes of the lens modules 22, 32, respectively.

The signal processing circuit 50 calculates ratios of the two distances D1, D2 to the focal lengths represented by the respective focuses F1, F2. A short distance is defined between each of the first and second lens modules 22, 32 and the image sensor 24. In the present example, the first position A is assumed to be located at a very front of the light source 10, and the second position B is assumed to be located at a front end of the image capture apparatus 20 which faces the light source 10. That is, the perpendicular distance between the first position A and the second position B is the perpendicular distance X between the very front of the light source 10 and a line C3 that passes through the centers of the first and second lens modules 22, 32.

If the perpendicular distance X between the light source 10 and the line C3 is far enough, an image distance of an image focused on the image sensor 24 is similar the focal length of the first focus F1 and the focal length of the second focus F2. The image sensor 24 is disposed near the focuses F1, F2. The image sensor 24 detects the light beams C1, C2 from a certain far distance clearly without any autofocus devices. Two angles θ1, θ2 are respectively defined between the light beams C1, C2 emitted from the light source 10 and the line C3 passing through the centers of the first and second lens modules 22, 32. According to trigonometric functions, two tangent values of two complementary angles θ3, θ4 of the angles θ1, θ2 are similar to the ratios of the two distances D1, D2 to the corresponding focal lengths of the focuses F1, F2, respectively. The signal processing circuit 50 calculates the ratios of the two distances D1, D2 to the focal lengths of the respective focuses F1, F2, and thus obtains the value of each angle θ1, θ2. Then the perpendicular distance X between the light source 10 and the line C3 connecting the first and second lens modules 22, 32 can be obtained using the following formula:

$$X = \frac{L \times \tan\theta_1 \times \tan\theta_2}{\tan\theta_1 + \tan\theta_2}.$$

Importantly, a light absorption board 28 is disposed generally between the first lens module 22 and the second lens module 32 for absorbing light reflected from the lens modules 22, 32 and thereby reducing optical interference. In the illustrated embodiment, the light absorption board 28 spans a region from the line C3 to a middle of the image sensor 24. In alternative embodiments, the light absorption board 28 can instead be another suitable kind of light absorption member.

The construction of the distance measuring system 100 is simple, and the volume of the distance measuring system 100 is small. In one exemplary application, the distance measuring system 100 can be disposed in an electronic product to measure a distance between two parts of the electronic product.

It is to be understood that the described embodiments are intended to illustrate rather than limit the disclosure. Variations may be made without departing from the spirit of the disclosure as claimed. The described embodiments illustrate the scope of the disclosure but do not restrict the scope of the disclosure.

What is claimed is:

1. A distance measuring system comprising:
   a light source configured to emit light;
   an image capture apparatus including a first lens module, a second lens module, and an image sensor, the first lens module and the second lens module being separated from each other a distance, the first lens module and the second lens module disposed between the light source and the image sensor, each of the first lens module and the second lens module defining a center axis, the first lens module having a first focus, the second lens module having a second focus, the image capture apparatus capable of detecting two light beams emitted from the light source and transmitting through the first lens module and the second lens module at two optical spots of the first lens module and the second lens module, respectively, the image capture apparatus also capable of measuring two distances between the two optical spots and nearest points of the center axes of the two lens modules, respectively, and measuring two angles defined between the two light beams and a line that passes through both a center of the first lens module and a center of the second lens module, respectively;
   a light absorption member disposed generally between the first lens module and the second lens module for absorbing light reflected from the lens modules and thereby reducing optical interference; and
   a signal processing circuit configured for calculating ratios of the two distances to two focal lengths represented by the two focuses, respectively, obtaining a value of each of the angles accordingly, and calculating a perpendicular distance from the light source to the line that passes through the first and second lens modules based on the angles and a length of the sensitive center portion of the image sensor between the two optical spots.

2. The distance measuring system as claimed in claim 1, wherein the light source is one of a halogen light source, a fluorescent light source, and a light-emitting diode.

3. The distance measuring system as claimed in claim 1, wherein the image sensor is one of a charge-coupled device and a complementary metal oxide semiconductor.

4. The distance measuring system as claimed in claim 1, wherein the perpendicular distance is calculated using the formula:

$$X = \frac{L \times \tan\theta_1 \times \tan\theta_2}{\tan\theta_1 + \tan\theta_2}$$

where X is the perpendicular distance, L is the distance between a center axis of the first lens module and a center axis of the second lens module, and θ1 and θ2 are the two angles defined between the two light beams and the line that passes through both the center of the first lens module and the center of the second lens module.

5. The distance measuring system as claimed in claim 1, wherein the light absorption member is a light absorption board.

6. The distance measuring system as claimed in claim 1, wherein the light absorption member spans a region from the line that passes through the centers of both the first and second lens modules and a middle of the image sensor.

* * * * *